UNITED STATES PATENT OFFICE.

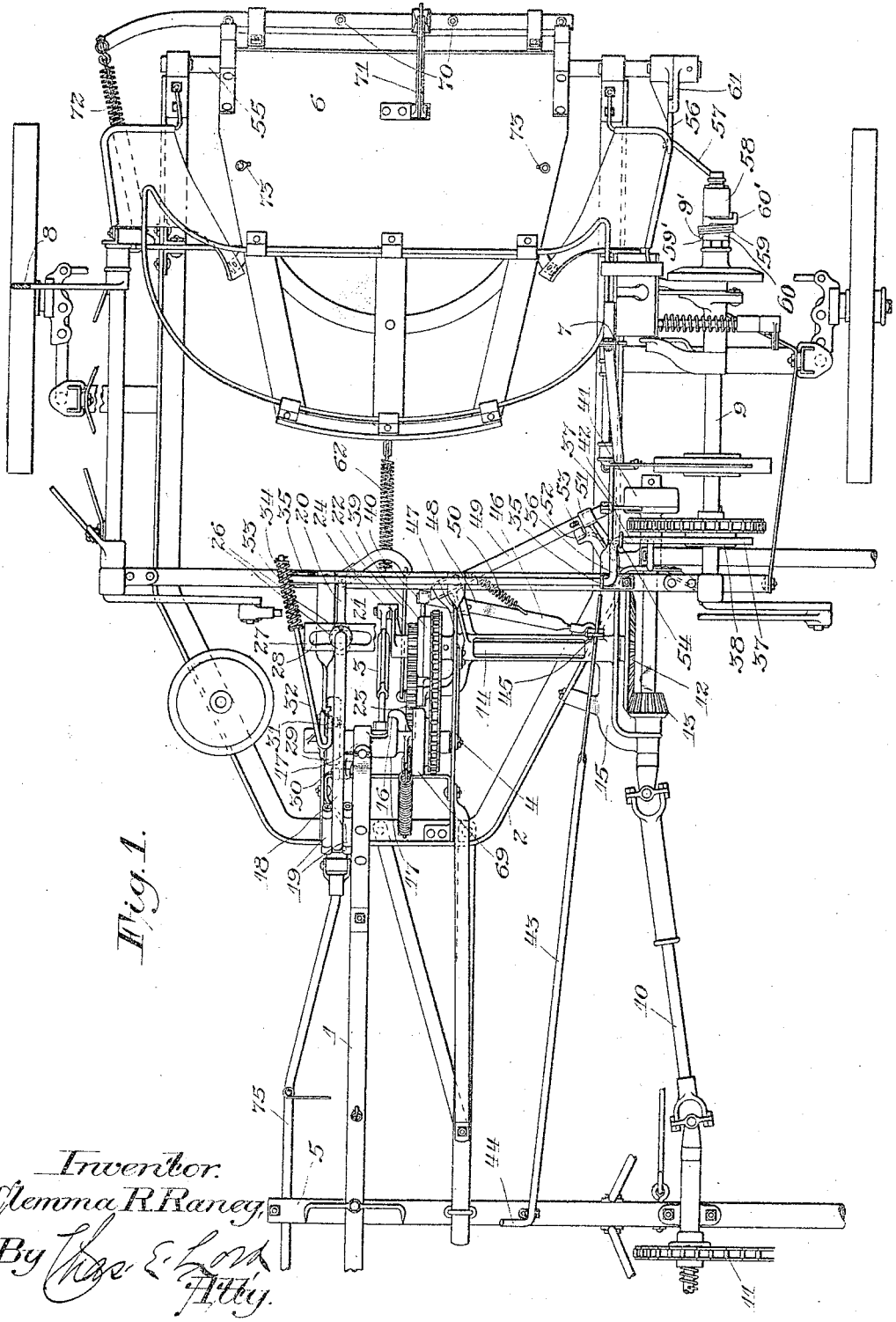

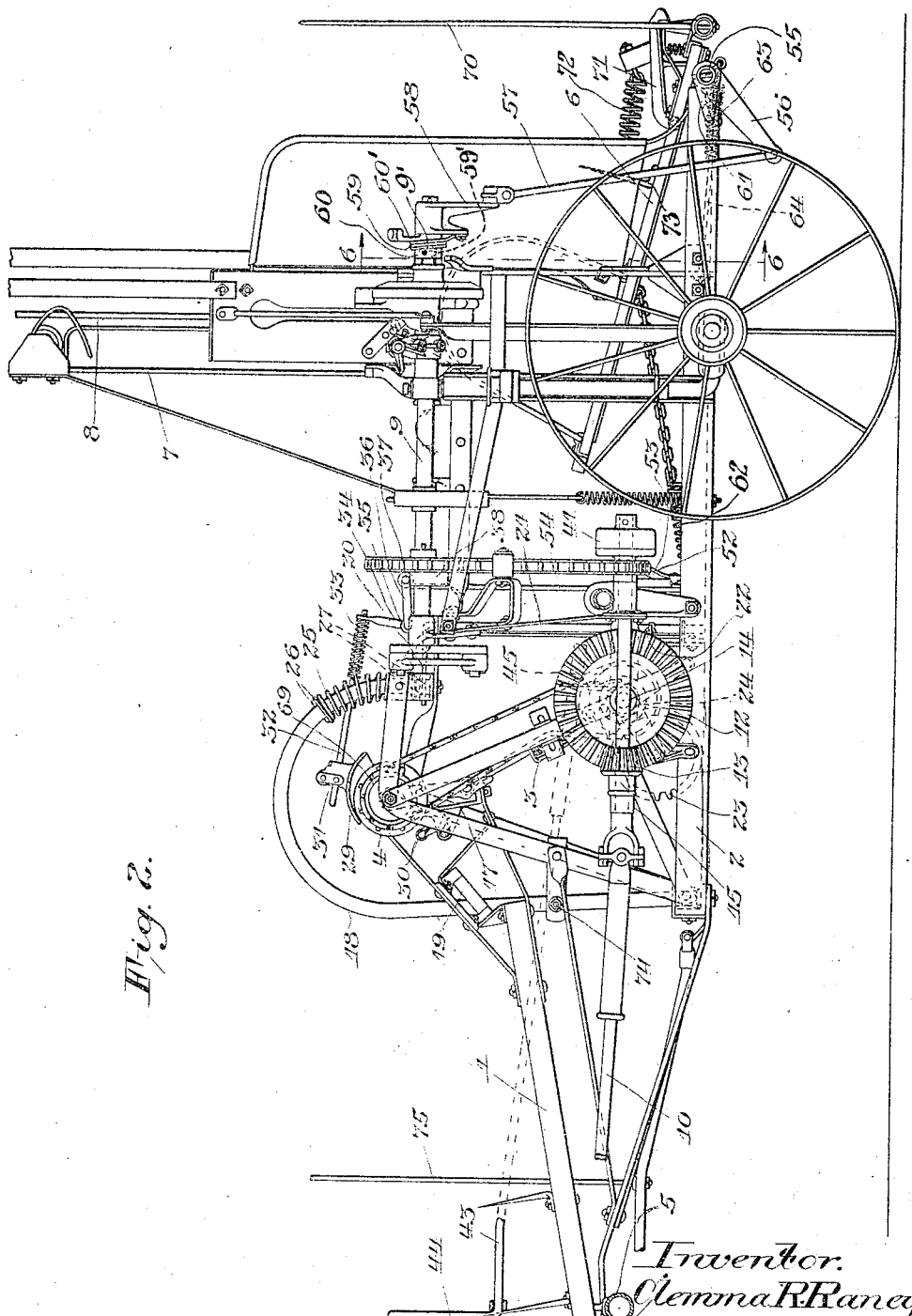

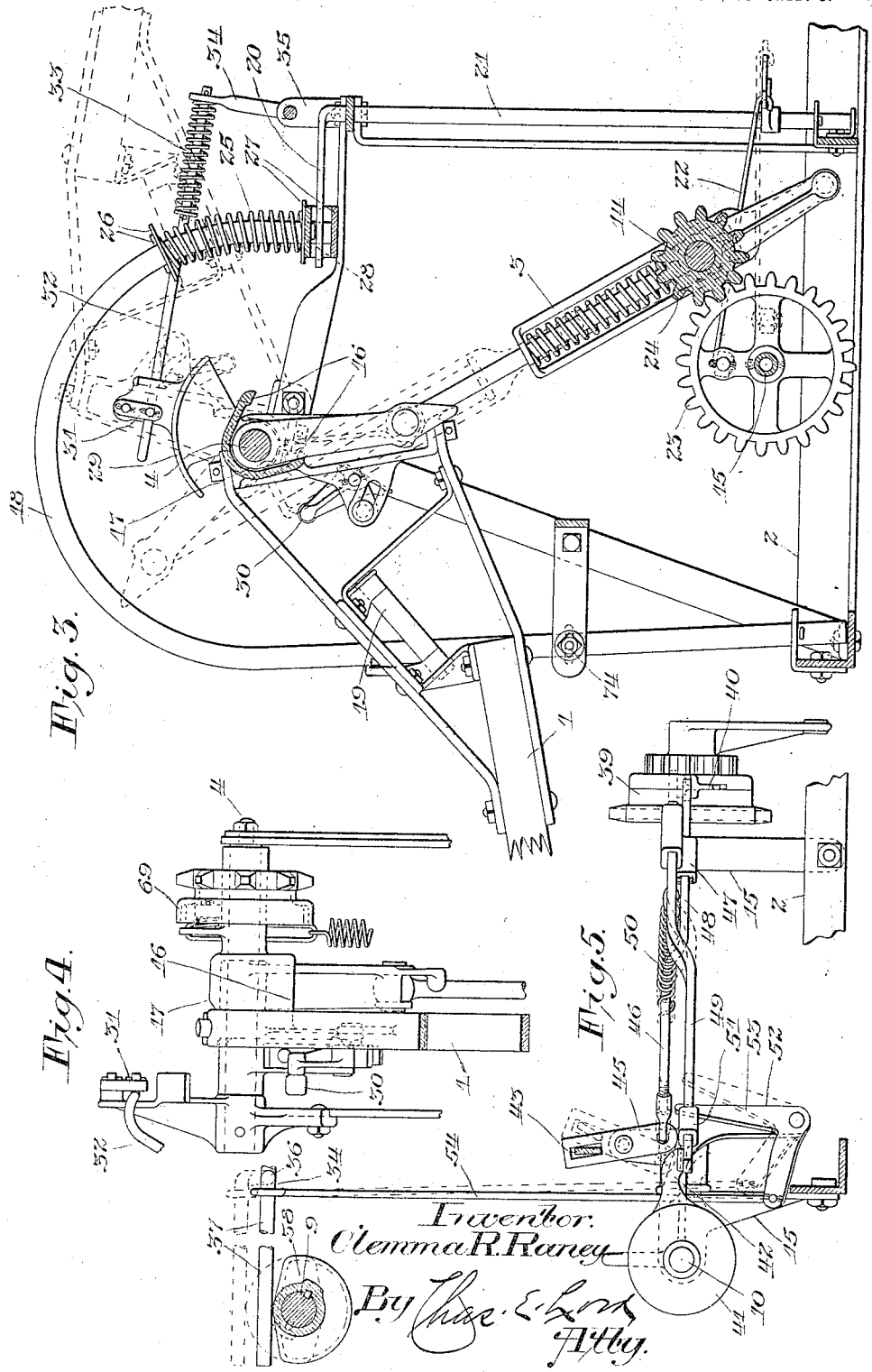

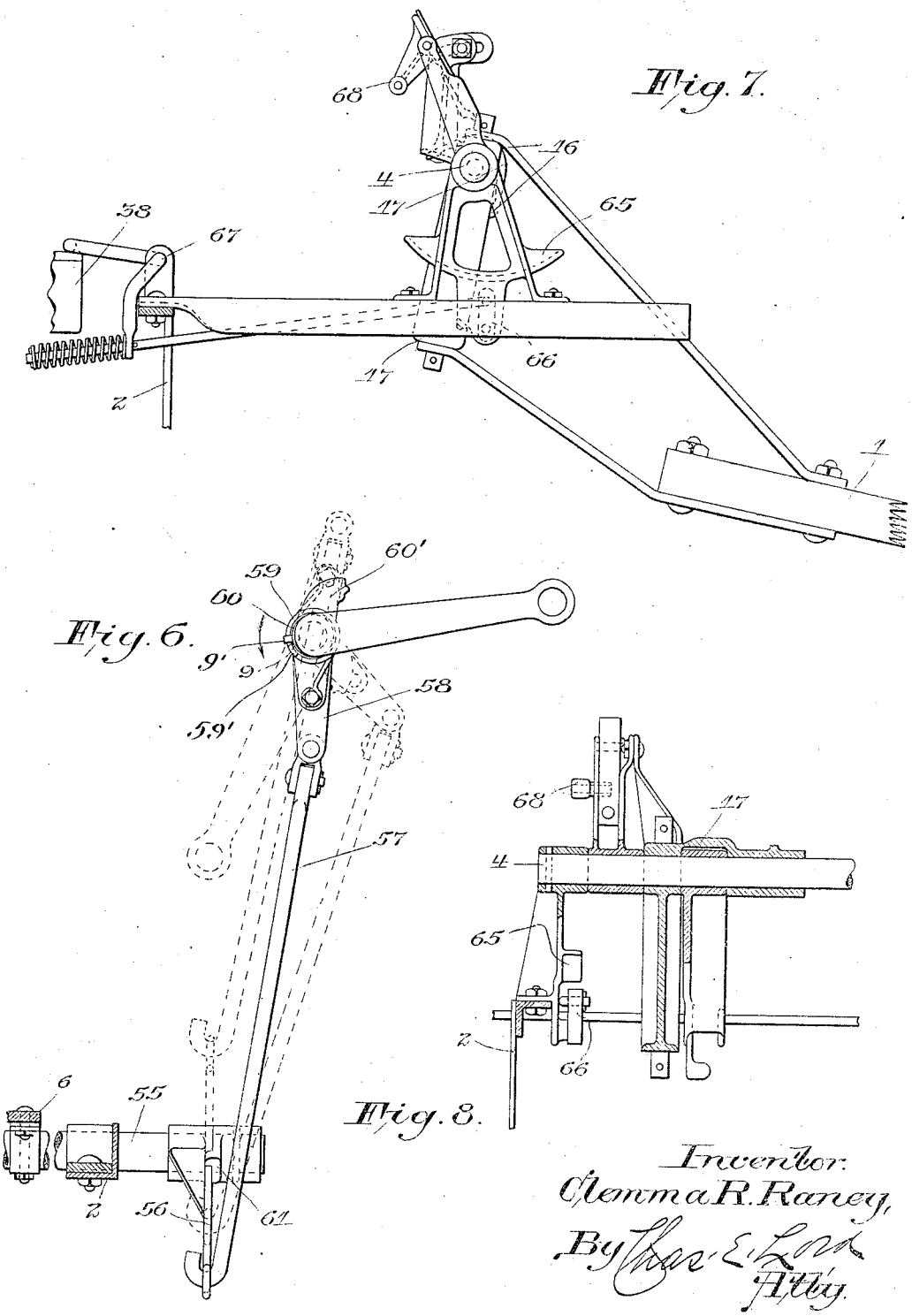

CLEMMA R. RANEY, OF CHICAGO, ILLINOIS, ASSIGNOR, BY MESNE ASSIGNMENTS, TO INTERNATIONAL HARVESTER COMPANY, A CORPORATION OF NEW JERSEY.

GRAIN-SHOCKER.

1,293,922.  Specification of Letters Patent.  Patented Feb. 11, 1919.

Application filed July 19, 1915. Serial No. 40,660.

*To all whom it may concern:*

Be it known that I, CLEMMA R. RANEY, a citizen of the United States, residing at Chicago, in the county of Cook and State of Illinois, have invented certain new and useful Improvements in Grain-Shockers, of which the following is a full, clear, and exact specification.

My invention relates to grain shockers.

It has for its object to improve and simplify the construction of such a machine. More specifically it has for its object to improve and simplify the driving, controlling and dumping mechanism of a shocker in such a manner as to reduce the weight thereof and decrease the cost of labor and material in manufacturing, at the same time that a sturdy mechanism is provided which is well adapted to withstand long service in the field. I attain these objects by an improved construction and combination of parts in which the power is taken from the binder in an improved manner through simplified mechanism and in which the controlling mechanism for the fork clutch and the shock binding clutch, as well as the dumping mechanism for the shock receptacle, is also materially simplified. These and other improvements not herein specifically mentioned will be more fully hereinafter brought out.

In the accompanying drawings I have shown a preferred and modified form which my invention may assume in practice, and in the following description shall refer to these forms as examples of the various embodiments which my invention may assume.

In these drawings:

Figure 1 is a plan view of a shocker equipped with my improvements;

Fig. 2 is a side elevation of the same;

Fig. 3 is a detail view of the fork driving and deflecting mechanism;

Fig. 4 is an end elevation of a portion of the mechanism shown in Fig. 3;

Fig. 5 is a detail view showing the operative connections between the size control mechanism actuated by the fork and the controlling mechanism for the fork and shock binding clutches;

Fig. 6 is a detail view taken on line 6—6 of Fig. 2 and looking toward the rear, showing the dumping mechanism in a plurality of positions;

Fig. 7 is a detail view in modified form of the size control mechanism shown in Fig. 3;

Fig. 8 is a partial transverse sectional view of the mechanism shown in Fig. 7.

In these drawings I have illustrated a shocker of the general type described and claimed in my copending application, Serial No. 573,106, filed July 21, 1910, a rearwardly swinging sheaf delivery member or fork 1 being used which is carried on a shocker frame 2 and movable by means of a resilient pitman connection 3 about an axis on a shaft 4 from its sheaf receiving position shown in Fig. 1, wherein it rests on a support 5 at a point beneath the deck of the binder, to its sheaf delivering position, wherein it delivers the sheaves in prostrate position in an upwardly and rearwardly movable shock receptacle 6 carried at the rear of the shocker frame. Also, after the manner of the construction described and claimed in my copending application, Serial No. 742,535, filed January 17, 1913, when enough sheaves have been delivered to the shock receptacle 6 to build a shock therein of a predetermined size, a compressor 7 and needle 8 are thrown into operation to compress and bind the shock, and at the completion of the compressing and binding operation, through the rotation of a knotter shaft 9, the shock receptacle is moved upward and rearward to deposit the shock in upright position upon the ground.

The fork 1 and all the other mechanisms upon the present shocker are driven from a longitudinally disposed power shaft 10 which is of extensible and flexible character and is connected between a power chain 11 on the binder and a beveled driving gear 12 on the shocker through a coöperating beveled gear 13. As shown, the rear end of the shaft 10 is journaled on a bracket 15 on the shocker frame, which also preferably acts as a journal for a short transversely disposed power shaft 14. This shaft 14 is in turn connected in a well-known manner to the resilient pitman connection 3 by which the sheaf delivery member 1 is operated. The construction of the connection of this pitman to the fork is substantially the same as that set forth in my last mentioned application, the fork herein, however, being swung back and forth about the shaft as an axis and having play between the shoulders 16 on the member 17 which is moved by the pitman connection 3.

As the fork is moved back and forth by its power connection, it is also deflected laterally by means of a curved bail or guide 18 which is connected to the fork through a plurality of rollers 19 disposed on opposite sides of the bail and moved with the fork. The bail 18 is deflected alternately to one side or the other of the receptacle by means of a crank 20 and rotatable shaft 21, which is in turn connected, through a link 22, with the two to one gearing 23, 24 journaled on the frame at a point beneath the shaft 4. In a preferred form the larger gear 23 is carried on a suitable extension on the bracket 15 hereinabove referred to and driven from the shaft 14. This deflecting mechanism broadly, however, forms no part of my present invention, being described and claimed in my last mentioned copending application.

As the sheaf delivery member 1 moves to the sheaf delivering position, it is also to be noted that it is controlled by springs after the manner described and claimed in my last mentioned application, one of the springs herein which cushions its movement and gives it a backward impulse assuming the form of a coiled spring 25 encircling the end of the guide 18 and held in position thereon by a washer and cotter pin 26. Obviously, the rollers 19 on the delivery member 1 will engage the washer 26 and act to compress this spring each time that the fork swings back to deliver a sheaf. In order to prevent bending of the crank 20 by this constant hammering, I preferably also provide a plurality of superimposed plates 27, both of which are connected between longitudinally disposed supplemental frame members which act to carry the shaft 4, the upper of these plates 27 preferably being slotted at 28 in such a manner as to permit the bail 18 to move in its arc when deflected by the two to one gear mechanism.

Coöperating with the sheaf delivery member 1 and controlling the compressing, binding and discharging mechanism, is a size control mechanism of the specific type described in my copending application, Serial No. 743,740, filed January 23, 1913, comprising a cam 29 of arcuate section disposed above the shaft 4 and normally having its upper and lower surfaces successively engaged by a member 30 movable with the fork which, when the sheaves in the receptacle 6 have reached a certain height, through its power connections is obliged to move back over the upper surface of the cam 29 into engagement with a normally inoperative trip 31. This trip 31 is then operated and, through a rod 32 and spring connection 33, actuates a clutch controlling member 34. In this construction the clutch controlling member 34 is in the form of a crank, being provided with an upstanding arm at its stubbleward end and journaled in brackets 35 upon the frame. As shown, this member 34 extends directly grainward to a point substantially above the beveled gear 12, where it is provided with a short rearwardly extending portion 36 and a second grainwardly extending portion 37 which overlies a cam 38 formed on the knotter shaft.

As described in my first mentioned copending application, and in a manner common to all shockers of this type, a clutch 39 is provided on the shaft 14 which controls the movement of the fork 1. This clutch is provided with a rotatable dog 40 and controls the pinions 23 and 24. A second clutch 41, having a rotatable clutch member or dog 42, is also provided which controls the connection of the compressing, binding and discharging mechanism of the shocker. This clutch 41 is located slightly in rear of the beveled gear 13 upon a continuation of the shaft 10 carrying that gear and, as shown, accomplishes the above ends by controlling the connection of the knotter shaft 9 to the power, which is continuously obtainable from the shaft 10 while the binder is in motion.

My improved clutch controlling mechanism acts to control both of these clutch mechanisms through successive engagements and disengagements of the rotary clutch members 40 and 42. When the member 43 is rocked about its pivot by the deck trip 44 and the longitudinally adjustable rod 45, as described in my copending application, Serial No. 801,527, filed November 17, 1913; i. e., when a bundle passes over the deck of the binder, the rotating clutch finger 40 of the fork clutch 39 is released, a clutch controlling member 46 being withdrawn from the path of the rotatable clutch member 40 in such a manner as to allow the clutch 39 to connect the fork to the power shaft 14. The member 46, controlling the clutch, is slidably mounted in a bearing 47, preferably formed in the bracket 15, and is provided with a depressed portion 48 at its stubbleward end which enables it to pass under another and coöperating clutch controlling member 49 disposed at an angle of about 45° with respect thereto and preferably connected to it by a spring 50. As shown, these two members 46 and 49 are both of flat strap or bar construction and are reciprocably mounted in their supports, the member 49 preferably moving through a slotted bearing similar to the slotted bearing for the member 46, and also being provided with a similar slotted bearing in a support 51 also preferably integral with the bracket 15 and adjacent the path of the clutch member 42, so that this member, when reciprocated, may successively engage the rotating dogs 40 and 42. Pivotally mounted at a point beneath the clutch controlling member 49 is a bell crank 52, having its free arm 53 protruding into an opening in the clutch controlling member 49, in which it preferably has a slight play, and its other arm connected to a vertically disposed rod 54, which is in turn connected to the crank member 34 at a point adjacent this laterally extending portion 37.

Coöperating with my improved controlling mechanism and driven from any suitable intermittently movable part of the power mechanism; as, for instance, the knotter shaft 9, is my improved dumping mechanism. This mechanism replaces the upwardly swinging pivoted arm described in my copending application, Serial No. 573,106, filed July 21, 1910, which I have heretofore used to swing up underneath the shock receptacle and move the same from its normal prostrate position to its vertical or shock discharging position. The new mechanism is illustrated in detail in Figs. 1, 2 and 6, wherein it is to be noted that the receptacle 6 is fixed to the shaft 55 instead of rotating thereon, and is connected to the knotter shaft through a short crank 56 rotatably mounted on the shaft 55, an upwardly extending link 57 pivoted to the crank 56, and a second crank 58 flexibly connected to the upper end of the link 57 and itself rotatably mounted on the rear end of the knotter shaft 9, a spring 59 coiled about a sleeve 60 secured to the shaft 9 by a pin $9^1$, which pin, in addition to securing the sleeve to the shaft, extends outwardly through said sleeve, forming a projecting stud. One end of said spring 59 is provided with a hook $59^1$ positioned in the path of the lug $9^1$, and the other end of the spring is secured to the arm 58. The sleeve 60 carries a laterally extending lug $60^1$ which engages with the edge of the crank arm 58 to rotate it during a portion of the revolution of the knotter shaft 9 in such a manner as to raise and lower the link 57.

The operation of these parts is as follows: Upon the rotation of the knotter shaft 9 the sleeve 60 carrying the pin $9^1$ is also rotated from the position shown in full lines on Fig. 6 to a position approximately 180° from its initial position, as shown by dotted lines in said figure. During this rotation the lug $9^1$ contacts with the hooked end $59^1$ of the spring 59 and puts said spring under tension, and the laterally projecting lug $60^1$ contacts with the edge of the crank arm 58, carrying said crank arm to the position indicated in dotted lines. At this point in the revolution of the knotter shaft 9, the tension of the spring becomes sufficient to carry the crank arm 58 ahead of the lug $60^1$ and to return said crank arm and the link 57 to the position shown in full lines in Fig. 6. Secured to the shaft 55, and rotated in the path of the edge of the crank 56 is a gagging member 61 engaged by said crank 56 when the crank is raised by the link 57. When the link 57 is returned to its normal position by the spring 59, the crank 56 will also be lowered to its full line position shown in Fig. 6. Obviously, as soon as each shock is set, the receptacle 6 will also be returned to its normal position by a longitudinally disposed spring and chain connection 62 which is connected between the receptacle 6 and a point at the front of the frame, a spring 63 connected to a longitudinally disposed rod 64 coöperating with this spring and also acting to cushion the receptacle as it returns to sheaf receiving position.

In the construction shown in Figs. 7 and 8, I have illustrated a modification of the binder clutch controlling mechanism, or size control mechanism, described above, wherein, instead of using a cam of the construction shown in the preceding figures, a modified cam 65 is employed, which is reversed as compared with the cam 29, and has a coöperating and correspondingly reversed tripping member 66, which is connected to a clutch controlling member 67 having a depending crank thereon. In the use of this mechanism it is also necessary to reverse the position of the trip actuating member carried by the fork 1, an actuating member 68 being provided thereon, as shown, in order to coöperate with the reversed cam 65. The operation of this mechanism is, of course, the same as that described above. It will be noted, however, that this construction may, in certain ways, be made very much more compact than that which I have used heretofore, and that it in certain ways also lends itself better to the problem of providing a mechanism which may not be broken during shipment.

In coöperation with the mechanism above described, it is, of course, to be understood that I may, if desired, use any suitable fork retarding clutch 69 to eliminate the hammering and rebounding of the fork resulting from its increased speed of movement when returning to sheaf receiving position. This form of clutch is shown and described in detail in my copending application Serial No. 801,525, filed November 17, 1913. As shown, I also preferably use upstanding end tines 70 at the rear of the shock receptacle which are controlled by any suitable latch 71, so that they are dropped rearward as the receptacle 6 moves backward in such a manner as to underlie the shock butt, these tines being returned to their normal upstanding position after each shock is set, by means of a spring 72. It is further obvious that if desired I may also use any suitable means, such as one or more upstanding tines 73, in the receptacle for holding the sheaves in the receptacle in proper position during the building and setting of the shock. In the use of the deflecting bail 18 it is also to be understood that the bail may also be mounted resiliently through a suitable connection 74 so that it may yield bodily laterally when desired. Similarly, if desired, a bundle stopping member or sheaf supporting member 75 may be disposed on the stubbleward side of the fork 1 when the latter is in sheaf receiving position in order to limit the outward throw of the bundles ejected from the binder deck. These mechanisms *per se*, however, form no part of my present invention.

In the operation of the shocker shown herein, with the parts in the position shown in Fig. 1, when a sheaf is delivered from the binder the trip 44 is actuated in such a manner as to rock the member 45 and withdraw the sliding clutch member 46 from engagement with the fork clutch dog 40 of the fork clutch so that the fork 1 is connected to the power shaft 14, which is constantly rotated by the power connection 10. Due to this connection the sheaves are successively delivered in the receptacle 6 with their butts toward the rear, the fork 1 as it moves rearward being deflected by the bail 18 so that it builds up a prostrate shock in which the sheaves have converging or overlapping heads and diverging butts. This operation will continue as the shock is built up, with the clutch controlling member being reciprocated into and out of engagement with the clutch dog 40 as the trip 44 is actuated by each sheaf. When, however, the sheaves in the receptacle 6 have reached a certain height; i. e., when the shock has reached a certain size, the member 30, which moves with the fork 1, will not be enabled to pass over the entire surface of the cam 29 due to the fork striking the sheaves already in the receptacle. As a result, this member 30 will be obliged to pass backward over the same upper surface over which it has just traveled instead of going into engagement with the under surface of the cam. In doing this, it will trip off the tripping member 31 and, through the rod and spring connection 32, 33, rock the crank 34 in its bearings in such a manner as to raise the link 54. The upward movement of this link 54 will rock the bell crank 52 about its pivot and move the slidable clutch controlling member 49 stubblewardly in its bearings so that its grainward end will be disengaged from the rotating clutch dog 42 and its stubbleward end projected into the path of the clutch dog 40 of the fork clutch. Obviously, as soon as the clutch dog 42 is disengaged, the clutch 41 will connect the compressing, binding and discharging mechanism to the power shaft 10 for two revolutions, the cam 38 on the knotter shaft rotating therewith in timed relation so as to hold the link 54 in its elevated position shown in Fig. 5 until after the clutch dog 42 has started on its second revolution. Obviously, also, with the clutch dog 40 held against rotation by the stubbleward end of the clutch controlling member 49, the fork 1 will be also held out of operation during the operation of the compressing, binding and dumping mechanism. When, however, the clutch dog 42 has completed its first revolution and started on its second revolution, the cam 38 will then allow the crank member 36, 37 to drop down to the position shown in full lines in Fig. 5. This, through the springs 33 and 50, will cause the bell crank 52 to be rocked from the dotted line position shown in Fig. 5 to the full line position shown therein, thus withdrawing the stubbleward end of the clutch controlling member 49 from the path of the rotating clutch dog 40 and projecting it into the path of the clutch dog 42. Obviously, with the member 49 in this position, the rotation of the dog 42 will be arrested after the second revolution and the fork mechanism will be free to operate when the next sheaf in its movement over the trip 44 on the binder deck causes the clutch controlling member 46 to be again withdrawn. During this movement it is obvious that the spring 50 will coöperate with the two clutch members to assist in the clutch shifting operation. So far as the dumping mechanism is concerned, attention is also directed to the fact that when the knotter shaft 9 is rotated, the gagging member 60 will also be rotated, carrying with it the spring-pressed crank 58 in such a manner as to raise the same from the full line position shown in Fig. 6 to the dotted line position shown therein. This raising movement of the crank 58 will cause a similar raising movement of the link 57 and crank 56 and, through the engagement of this last mentioned crank with the gagging member or stop 61 fixed to the shaft 55, will cause the rocking of that shaft about its pivot on the frame and the consequent dumping of the shock in the shock receptacle. It will be noted, however, that when the crank 58 has passed through slightly more than a half revolution, the spring 59 will then come into play in such a manner as to take up or continue the rotation of the crank at a higher speed, with the result of disconnecting the driving force and causing the parts to be returned to their normal full line position illustrated in Figs. 2 and 6. Obviously, the rest of the mechanism will also be automatically returned to its initial position in a well-known manner.

It will be noted that in my improved construction the necessity for a long cross shaft, forming the main power shaft of the shocker, is obviated and that the single short shaft 14, through the improved connections provided, performs both the function of the long shaft and the short shaft usually provided upon shockers of this type. It is also to be noted that by the provision of my improved controlling mechanism, the construction is materially simplified from an assembling standpoint, substantially all of the work requiring accuracy in gaging and the like being required to be done upon the controlling mechanism, which, as shown, constitutes substantially a single unit, the various parts, as shown, preferably being supported by a single casting. By this construction practically only a single skilled operator is required in the assembling of the machine in the factory, the rest of the work being of a type which may be done by relatively unskilled labor. Other advantages of my improved construction will also be apparent to one skilled in the art.

While I have in this application specifically described certain forms which my invention may assume in practice, it is, of course, to be understood that these forms are used for purposes of illustration and that the invention itself is not limited to embodiment in the same but may be used in various other forms, all of which it is my intention to include within the scope of the appended claims.

What I claim as new is:

1. In a grain shocker, sheaf delivery mechanism including a clutch, shock binding mechanism coöperating with said delivery mechanism and also including a clutch, and a single clutch controlling member coöperating with each of said clutches.

2. In a grain shocker, sheaf delivery mechanism including a clutch, shock discharging mechanism coöperating with said delivery mechanism and also including a clutch, and a single clutch controlling member coöperating with each of said clutches.

3. In a grain shocker, sheaf delivery mechanism including a clutch, shock binding mechanism coöperating with said delivery mechanism and also including a clutch, and a single reciprocable clutch controlling member successively coöperating with each of said clutches.

4. In a trailing grain shocker, a frame, a shock receptacle sheaf delivery mechanism on said frame including a clutch and a pivoted arm for receiving the sheaves from an external source and delivering the same to the shock receptacle, a reciprocable clutch controlling member, shock discharging mechanism coöperating with said delivery mechanism and including a clutch, a second reciprocable clutch controlling member, and operative connections between said clutch controlling members.

5. In a grain shocker, a frame, sheaf delivery mechanism thereon including a clutch, a reciprocable clutch controlling member, shock discharging mechanism coöperating with said delivery mechanism and including a clutch, a second reciprocable clutch controlling member, and a spring operatively connected between said clutch controlling members.

6. In a shocking machine, sheaf delivery mechanism including a clutch, shock discharging mechanism including a clutch, means including a reciprocable clutch controlling member controlling said first mentioned clutch, and a second reciprocable clutch controlling member normally engaging said second clutch and projectable into engagement with said first mentioned clutch.

7. In a grain shocker, sheaf delivery mechanism including a clutch, shock discharging mechanism coöperating with said delivery mechanism and also including a clutch, clutch controlling members for said clutches, and means whereby one of the same is retracted from clutch engaging position and the other is similarly retracted from its clutch and projected into clutch engaging position with the other clutch.

8. In a grain shocker, sheaf delivery mechanism including a clutch, clutch controlling mechanism therefor controlled by the sheaves delivered to said delivery mechanism, shock discharging mechanism coöperating with said delivery mechanism and also including a clutch, and clutch controlling mechanism for the clutch of said shock discharging mechanism successively engageable therewith and with the clutch of said delivery mechanism.

9. In a grain shocker, a frame, sheaf delivery mechanism thereon including a clutch, a reciprocable clutch controlling member, shock discharging mechanism coöperating with said delivery mechanism and including a clutch, a second reciprocable clutch controlling member, and means for withdrawing said first mentioned clutch controlling member and thereafter withdrawing said second clutch controlling member and simultaneously projecting the same into engagement with said first mentioned clutch.

10. In a grain shocker, sheaf delivery mechanism, a clutch controlling the same, clutch controlling mechanism controlled by a sheaf delivered to said delivery mechanism, shock binding and discharging mechanism coöperating with said delivery mechanism and including a clutch, a clutch controlling member for said clutch, and means whereby when said first mentioned clutch controlling member is moved to inoperative position said second clutch controlling member is disengaged from said binder clutch and thrown into operative position with said first mentioned clutch.

11. In a grain shocker, sheaf delivery mechanism including a clutch, a reciprocating clutch controlling member movable into engagement with said clutch, mechanism controlling said clutch controlling member and controlled by a sheaf delivered to said delivery mechanism, shock discharging mechanism coöperating with said delivery mechanism and including a clutch, a reciprocable clutch controlling member therefor, and means whereby when said first mentioned controlling member is reciprocated out of engagement with its clutch said last mentioned controlling member may be disengaged from its clutch and reciprocated into engagement with the clutch of said delivery member.

12. In a grain shocker, sheaf delivery mechanism including a clutch, shock discharging mechanism coöperating with said delivery mechanism and including a clutch, a clutch controlling member for the clutch of said delivery mechanism, a clutch controlling member for the clutch of said discharging mechanism, means for successively disengaging said first clutch controlling member from said clutch, and means operable when a shock has reached a predetermined size for projecting said second clutch controlling member into engagement with said first mentioned clutch while its clutch controlling member is disengaged therefrom.

13. In a shocking machine, sheaf delivery mechanism including a clutch, a reciprocable clutch controlling member therefor, actuating mechanism for said controlling member controlled by a sheaf delivered to said delivery mechanism, a second reciprocable clutch controlling member, shock binding mechanism including a clutch controlled by said second clutch controlling member, and means controlled by the size of the shock for disengaging said last mentioned member from said last mentioned clutch and throwing the same into engagement with said first mentioned clutch while said first mentioned clutch controlling member is disengaged therefrom.

14. In a shocking machine, a frame, sheaf delivery mechanism thereon including a clutch, a reciprocable clutch controlling member slidable on said frame, a member pivoted on said frame and connected to said clutch controlling member, a tripping member actuated by a sheaf delivered to said delivery mechanism and in turn controlling said clutch controlling member, shock discharging mechanism including a clutch, means controlled by the size of the shock and controlling said last mentioned clutch including a bell crank pivoted on said frame, and a second clutch controlling member reciprocably mounted on said frame and engageable with said first mentioned clutch when said first mentioned clutch controlling member is disengaged therefrom.

15. In a shocking machine, mechanism for building a prostrate shock, shock binding mechanism coöperating therewith and including a clutch, means operated when the shock has reached a predetermined size including a bell crank, and a movable clutch controlling member operatively connected to said bell crank and movable thereby into and out of engagement with said clutch.

16. In a shocking machine, mechanism for building a prostrate shock, shock binding mechanism coöperating therewith and including a clutch, means set in operation by said shock building mechanism operable when the shock has reached a predetermined size including a bell crank, and a movable clutch controlling member operatively connected to said bell crank and movable thereby into and out of engagement with said clutch.

17. In a shocking machine, mechanism for building a prostrate shock, shock binding mechanism coöperating therewith and including a clutch, means engaged and actuated by said shock building mechanism operable when the shock has reached a predetermined size including a bell crank, and a movable clutch controlling member operatively connected to said bell crank and movable thereby into and out of engagement with said clutch.

18. In a shocking machine, a frame, sheaf delivery mechanism including a sheaf delivery member movable in an upright plane, shock binding and discharging mechanism including a clutch, mechanism controlled by the size of the shock and controlling said clutch including a tripping member engaged and actuated by said delivery member, a rocking member journaled on said frame and connected to said tripping member, and means actuated by said rocking member controlling said clutch.

19. In a shocking machine, sheaf delivery mechanism including a swinging sheaf delivery member, a tripping member actuated thereby when the shock built by said delivery member has reached a predetermined size, shock binding mechanism including a clutch, means operatively connected to said tripping member and controlling said clutch for enabling the latter to make a plurality of revolutions including a cam and pivoted bell crank, and a clutch controlling member projectable into or out of engagement with said clutch upon movement of said bell crank.

20. In a shocking machine, a frame, a dumping shock receptacle pivoted thereon, a shaft rotatable with said receptacle, a member fixed to said shaft, a member journaled on said shaft and engageable with said first mentioned member, a power shaft on said frame, a member rotatable therewith, a member journaled on said shaft and engaged by said rotatable member, and operative connections between said rotatable members.

21. In a shocking machine, a frame, a dumping shock receptacle pivoted thereon, a shaft rotatable with said receptacle, a member fixed to said shaft, a member journaled on said shaft and engageable with said first mentioned member, a power shaft on said frame, a member rotatable therewith, a member journaled on said shaft and engaged by said rotatable member, a resilient connection between said last mentioned journaled member and said power shaft, and operative connections between said journaled members.

22. In a shocking machine, a frame, a normally prostrate dumping shock receptacle pivoted thereon, a shaft positively connected to and adapted to dump said receptacle, a power shaft journaled on said frame, operative connections between said shafts whereby said first mentioned shaft is positively driven through a part of a revolution to dump said receptacle and the driving force is then instantaneously removed, and supplemental means distinct from said positive driving means for automatically returning the receptacle to its normal position.

23. In a grain shocker, a frame, a longitudinally disposed power shaft journaled theron, a stub shaft disposed at right angles to said power shaft and operatively connected thereto, clutches carried on said shafts, sheaf delivery mechanism operatively connected to and controlled by the clutch on said stub shaft, and shock discharging mechanism operatively connected to and controlled by the clutch on said power shaft.

24. In a grain shocker, a frame, a bracket carried thereon, a longitudinally disposed shaft journaled in said bracket, a second shaft disposed at right angles to said first mentioned shaft and journaled on said bracket, clutches carried on said shafts, and clutch controlling mechanism for each of said clutches carried on said bracket.

25. In a grain shocker, a frame, a bracket carried thereon, a longitudinally disposed shaft journaled in said bracket, a second shaft disposed at right angles to said first mentioned shaft journaled on said bracket driven by said first mentioned shaft, clutches carried on said shafts, and means including a plurality of reciprocable clutch controlling members slidably mounted on said bracket and engageable with the clutches on said shafts.

26. In a grain shocker, a frame, a sheaf delivery member pivoted thereon, means for swinging the same about its pivot, a guiding bail for said delivery member, mechanism for deflecting said bail laterally including a laterally extending crank connected to one end of said bail, spring mechanism carried on the same end of said bail and compressible by said delivery member, and means between said spring and crank for preventing bending of the latter when said delivery member strikes said spring mechanism.

27. In a grain shocker, a frame, a sheaf delivery member pivoted thereon, means for swinging the same about its pivot, a guiding bail for said delivery member, mechanism for deflecting said bail laterally including a laterally extending crank connected to one end of said bail, spring mechanism carried on the same end of said bail and compressible by said delivery member, and a member on said frame interposed between said spring mechanism and said crank having a slot therein wherein moves the end of said bail connected to said crank.

In testimony whereof I affix my signature.

CLEMMA R. RANEY.

Copies of this patent may be obtained for five cents each, by addressing the "Commissioner of Patents, Washington, D. C."